United States Patent [19]

Blagg

[11] 4,436,475

[45] Mar. 13, 1984

[54] LOG SKIDDER WITH LOAD DISTRIBUTING BOOM ATTACHMENT

[75] Inventor: Leon Blagg, Marble Falls, Tex.

[73] Assignee: Rolligon Corporation, Stafford, Tex.

[21] Appl. No.: 348,801

[22] Filed: Feb. 16, 1982

[51] Int. Cl.³ .............................................. B66D 3/00
[52] U.S. Cl. .................................... 414/569; 254/325
[58] Field of Search ............... 414/538, 560, 559, 561, 414/569, 731; 254/323–328

[56] References Cited

U.S. PATENT DOCUMENTS

| | | | |
|---|---|---|---|
| 2,869,741 | 1/1959 | Winters et al. | 414/569 |
| 3,741,526 | 6/1973 | Kasin et al. | 414/559 X |
| 4,239,439 | 12/1980 | Blagg | 414/559 X |
| 4,315,652 | 2/1982 | Barwise | 414/569 X |

*Primary Examiner*—Robert G. Sheridan
*Attorney, Agent, or Firm*—Arnold, White & Durkee

[57] ABSTRACT

In accordance with an illustrative embodiment of the present invention, an attachment to a log skidder to enable selective distribution of the weight of a log being towed to the front and rear wheels comprises a boom pivotally mounted between its ends on the logging arch, the boom having an abutment surface on its rear end arranged to engage the elevated end portion of the log, and a hydraulic cylinder connected between the front end of the boom and the frame of the vehicle, the cylinder when extended causing upward force to be applied to the front end of the boom and to the logging arch and downward force to be applied to the elevated end portion of the log and to the vehicle frame to effect a transfer of weight to the front wheels of the vehicle.

10 Claims, 2 Drawing Figures

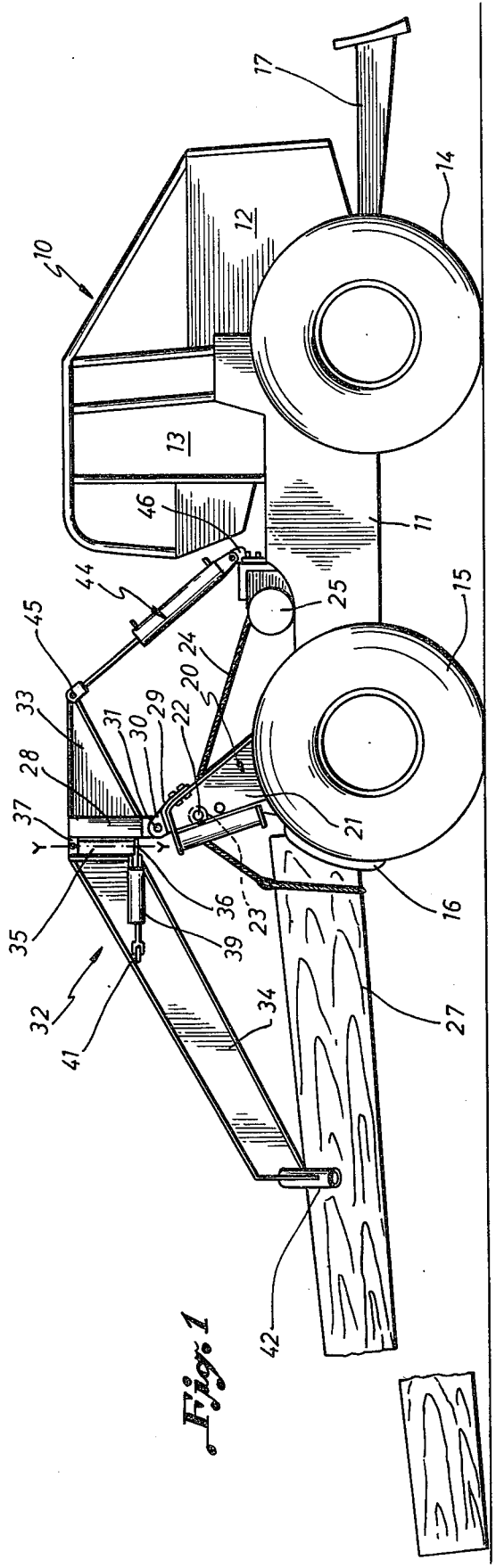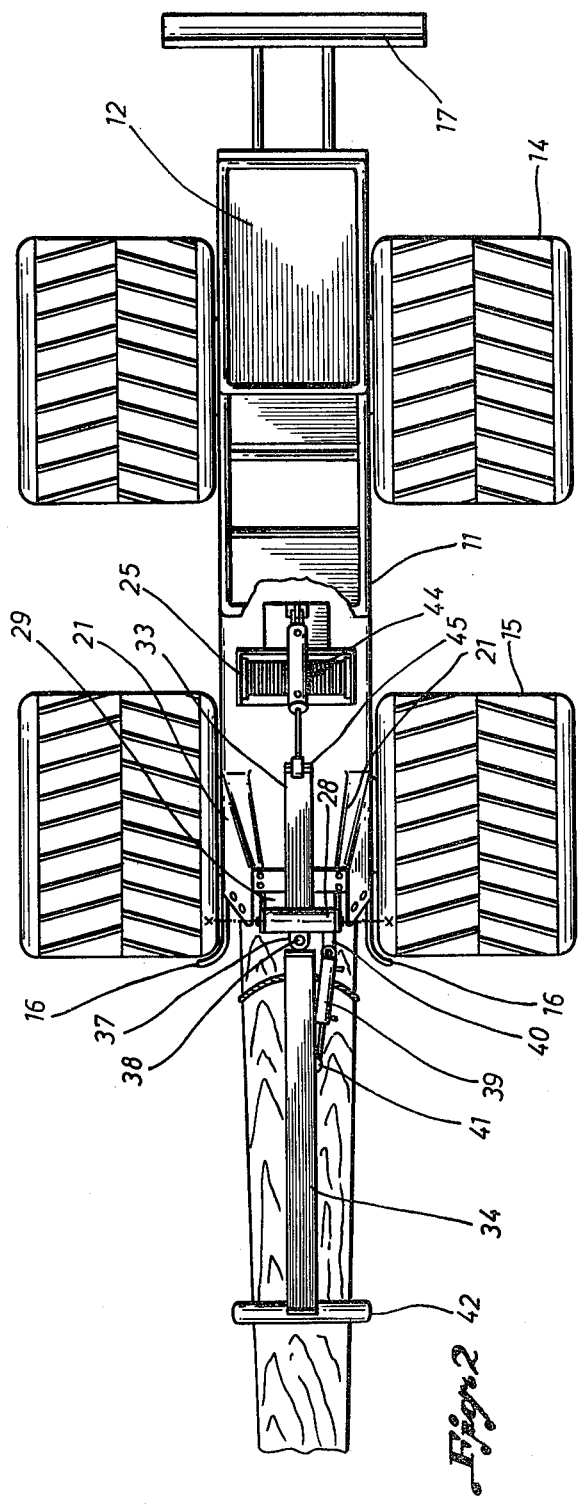

LOG SKIDDER WITH LOAD DISTRIBUTING BOOM ATTACHMENT

FIELD OF THE INVENTION

This invention relates generally to log skidder vehicles, and particularly to a new and improved apparatus used with a log skidder to enable a selected distribution of the log weight to the front and rear wheels of the vehicle while the logs are under tow.

BACKGROUND OF THE INVENTION

Log skidders are special purpose vehicles used in timber harvesting operations to move newly cut logs from the cutting site to a transport terminal or landing. Such vehicles operate in extremely rugged off-the-road conditions, and typically include a winch with the cable leading over a roller on a tilted A-frame or "logging arch" mounted on the rear of the vehicle frame. The cable is secured to the leading end of one or more logs so that such ends can be lifted off the ground while the logs are dragged or skidded behind the vehicle.

A large portion of the weight of the logs is bourne by the vehicle during skidding operations. If such weight is not properly distributed, for example where the entire weight is carried solely at the rear axle, the rear tires and particularly the traction flanges thereon can be rapidly damaged and worn out. Moreover, the rear tires when overloaded are more prone to sink into unstable soil and render vehicle operation inefficient and unsafe as well as unstable.

It is the general object of the present invention to provide a new and improved load distribution apparatus for use with a log skidder which enables the operator to effect a desired distribution of the log weight to the front and rear tires of the vehicle.

SUMMARY OF THE INVENTION

This and other objects are attained in accordance with the present invention through the provision of a log skidder apparatus comprising of a boom structure pivotally mounted about a transverse horizontal pivot axis located preferably at the upper end of the logging arch which is mounted on the rear of the vehicle. The boom structure has a portion extending rearwardly of the pivot axis with means at its rear end adapted to engage the elevated end portion of a log (or logs) that have been winched up to the vehicle, and a portion extending forwardly of such axis. Selectively operable means such as a hydraulic cylinder that is connected between the front end of the forwardly extending portion of the boom structure and the frame of the vehicle at a point in front of the rear wheels is arranged to apply downwardly directed force to both the log and the frame and upwardly directed force to the forwardly extending portion and thus the logging arch. The resulting moments cause a redistribution of the log weight with a resultant increase in the amount of weight being carried by front wheels of the vehicle and a reduction in the amount of weight carried by the rear wheels thereof. In a preferred embodiment, the boom structure is hinged about a vertical pivot axis located adjacent and to the rear of the above-mentioned horizontal pivot axis to enable the rearwardly extending portion thereof to swing with the log as the vehicle is turned, as well as to enable correct positioning over the log during loading. A second hydraulic cylinder or the like can be used to control swinging movement of the rear portion of the boom structure.

BRIEF DESCRIPTION OF THE DRAWINGS

The present invention has other objects, features and advantages which will become more clearly apparent in connection with the following detailed description of a preferred embodiment, taken in conjunction with the appended drawings in which:

FIG. 1 is a somewhat schematic side view of a log skidder apparatus constructed in accordance with the present invention; and FIG. 2 is a top view of the boom structure of the apparatus of FIG. 1.

DESCRIPTION OF A PREFERRED EMBODIMENT

Referring initially to FIG. 1, a log skidder constructed in accordance with the principles of the present invention includes a vehicle 10 having a frame 11 supporting an engine 12 and a driver's station 13. Front and rear wheels 14 and 15 engage the ground and preferably are low pressure pneumatic tires of the type disclosed in Albee U.S. Pat. No. Re. 24,272 to adapt the vehicle for all-terrain operation. The wheels 14 and 15 are mounted on conventional axles coupled to the frame and may all be driven by the engine 12 via typical differentials, drive shafts and a transmission (not shown). Steering may be accomplished by an articulated frame arrangement as shown, for example, in U.S. Pat. No. 3,630,302, assigned to the assignee of this invention. A hydraulically controlled blade 17 may be mounted on the front end of the vehicle 10 for pushing logs into appropriate positions to be skidded, as well as for other utilitarian purposes. Although a four-wheel arrangement is shown in the drawings, of course other wheel arrangements could be used.

An A-frame or "logging arch" 20 is mounted to the rear of the frame 11 and has side members 21 between which a shaft 22 extends carrying a horizontal roller 23. A cable 24 extends from a winch 25 over the roller 23, through guide rollers 23', and has its end looped around the front end of a log 27 that is to be skidded to a landing. Of course the front of the log 27 is stopped against the rear of the vehicle frame 11 between side fenders 16 that provide a protection for the rear tires 15 of the vehicle 10.

A plate 29 is rigidly fixed by bolting or the like to the top of the logging arch 20 and has laterally spaced brackets 30 thereon. A boom structure indicated generally at 32 is pivotally mounted on the plate 29 and has a front portion 33 and a rear portion 34. The front portion 33 has a headwall 28 with a tubular member at its lower edge, and a pivot pin 31 extends through the tubular member and the brackets 30 along a transverse horizontal pivot axis X—X. The rear portion 34 has a tubular member 35 welded to its front edge, and another pivot pin 38 extends through this member and through brackets 36 and 37 on the headwall along a vertical pivot axis Y—Y located adjacent and to the rear of the pivot axis X—X. The rear portion 34 thus can swing with respect to the front portion 33 about the axis Y—Y, with swinging movement being under the control of suitable means such as a hydraulic cylinder 39 connected between the outer end of an arm 40 on the headwall 28 and a bracket 41 on the rear portion 34. The cylinder 39 is a double-acting device of conventional construction that can be selectively actuated by the operator through manipulation of suitable hydraulic controls (not shown) located at the operators station 13. The entire boom assembly 32 can be pivoted about the transverse horizontal pivot axis X—X.

Another hydraulic cylinder 44 is connected between the outer end 45 of the front portion 33 and a bracket 46 that is attached to the frame 11 on the vehicle 10 at a point that is substantially forward of the rear axle of the vehicle. The cylinder 44 also is a double-acting device of typical construction and can be extended or retracted as desired from the operator's station 13 through manipulation of typical hydraulic controls (not shown) in order to control pivotal rotation of the boom assembly 32 about the pivot axis X—X. When the cylinder 44 is extended in order to pivot the rear section 34 downwardly, an abutment means such as an arcuate section of pipe 42 or the like that is fixed to the rear end of the rear portion 34 of the boom structure 32 is arranged to engage an upper surface of the log 27 and to push downwardly thereon.

OPERATION

In operation, the operator backs the vehicle 10 up as near as possible to the end of the log 27 and lets out the cable 24 from the winch 25 so that the cable can be looped around or otherwise attached to the log as shown. Then the log 27 is winched in toward the vehicle to bring the front end thereof up off the ground and adjacent the rear of the frame between the fenders 16. At this point, the entire weight of the log that is being bourne by the vehicle is being carried by the rear axle and tires 15. The cylinder 39 can be adjusted if necessary to swing the rear portion 34 of the boom structure 32 into longitudinal alignment with the log 27, and then the main cylinder 44 is extended to cause the boom structure 32 to pivot about the axis X—X until the means 42 abuts against the top surface of the log.

In order to effect a desired distribution of the load of the log to the front and rear wheels 14 and 15 of the vehicle 10, the hydraulic cylinder 44 is pressurized by a desired amount to cause the rod end 50 to push up on the front end of the boom structure 32 and the cylinder end 51 to push down on the vehicle frame 11. This causes the abutment means 42 to push down on the elevated end portion of the log 27. There is a resultant upward pull transmitted through the pivot pin 31 and the bracket 30 to the logging arch 20, which causes a weight transfer principally to the front wheels 14 of the vehicle 10, and, to a lesser amount, to the rear end of the log 27 that is engaging the ground. The weight carried by the rear wheels 15 is reduced.

The hydraulic pressure on the cylinder 44 preferably is applied with a conventional accumulator in the circuit to provide a spring-like action when uneven terrain is encountered as the log 27 is skidded over the ground.

Of course when light loads are being skidded, or while winching logs, or on any other occasion when use of the device is not needed, the cylinder 44 can be retracted to raise the boom structure 32 up and out of the way. The rear cylinder 39 can be hydraulically locked to prevent the rear portion 34 of the boom from swinging when the vehicle 10 is moving empty. With the boom structure in use as described above, the rear cylinder 39 is placed in neutral to enable free turning of the vehicle as it moves over the ground with the log (or logs) in tow.

It now will be recognized that a new and improved apparatus has been provided which enables a desired weight distribution to be applied to the wheels of a log skidder vehicle. Since certain changes or modifications may be made in the disclosed embodiment without departing from the inventive concepts involved, it is the aim of the appended claims to cover all such changes and modifications falling within the true spirit and scope of the present invention.

What is claimed is:

1. Apparatus for use with a log skidder vehicle having front and rear ground-engaging wheels, a frame, a logging arch at the rear of said frame, and winch and cable means for pulling the end of a log up to the rear of the vehicle and elevating the end portion thereof, comprising: an elongated boom structure having a front section and a rear section; means for pivotally mounting said boom structure at a location between its ends on said logging arch, said mounting means defining a transverse horizontal pivot axis; abutment means on the rear section of said boom structure arranged to engage the elevated end portion of the log in response to pivotal rotation of said boom structure about said axis; and selectively operable means connected between said front section and said frame for causing upwardly directed forces to be applied to said front section and to said arch, and downwardly directed forces to be applied to said log and said frame to thereby control the distribution of weight carried by the front and rear wheels of said vehicle.

2. The apparatus of claim 1 wherein said boom structure includes hinge connection means between said front and rear sections thereof, said connection means defining a generally vertical pivot axis located adjacent and to the rear of said horizontal pivot axis to enable said rear section to swing with respect to said front section; and further including additional selectively operable means for swinging said rear section with respect to said front section about said vertical pivot axis.

3. The apparatus of claim 1 wherein said selectively operable means includes a hydraulic cylinder adapted for remote control from said vehicle.

4. The apparatus of claim 2 wherein said additional selectively operable means includes a hydraulic cylinder adapted for remote control from said vehicle.

5. A log skidder vehicle comprising: a frame; front and rear ground-engaging wheels coupled to said frame; a logging arch mounted on the rear of said frame; cable means extending over said arch and adapted to winch the end of a log up to the rear of said frame and to lift the front end thereof off the ground; a bracket mounted on said arch and defining a transverse horizontal pivot axis; a boom structure pivotally mounted to said bracket, said boom structure having a front portion extending forward of said pivot axis and a back portion extending rearward thereof; abutment means at the rear of said back portion arranged to engage the elevated end portion of said log when said boom structure is tilted with respect to said pivot axis; and selectively operable hydraulic means connected between said front portion and said frame for tilting said boom structure to cause said abutment means to engage said log, said hydraulic means being then operable to react between said front portion and said frame to effect a transfer of a portion of the weight of said log being bourne by said vehicle from the rear wheels to the front wheels thereof.

6. The log skidder of claim 5 further including means for hinging said back portion for swinging movement with respect to said front portion about a generally vertical pivot axis located rearwardly of said horizontal pivot axis.

7. The log skidder of claim 6 further including means coupled between said front and rear portions for controlling the angular relationship therebetween.

8. The log skidder of claim 5 wherein said abutment means includes a generally arcuate member fixed to said rear of said back portion, said arcuate member being arranged to face downwardly so as to fit against a top surface of the log.

9. The log skidder of claim 5 wherein said hydraulic means includes a double-acting cylinder arranged to be remotely controlled from the operator's station of said vehicle.

10. The log skidder of claim 7 wherein said controlling means includes a double-acting cylinder arranged to be remotely controlled from the operator's station of said vehicle.

* * * * *